United States Patent [19]

Blythe et al.

[11] Patent Number: 5,115,021

[45] Date of Patent: May 19, 1992

[54] PNEUMATIC TIRES

[75] Inventors: Robert J. Blythe, Birmingham; Brian D. W. Powell, Nuneaton, both of England

[73] Assignee: Sumitomo Rubber Industries Ltd., Kobe, Japan

[21] Appl. No.: 372,877

[22] Filed: Jun. 28, 1989

[30] Foreign Application Priority Data

Jul. 2, 1988 [GB] United Kingdom ............... 8815793

[51] Int. Cl.⁵ .................. C08L 51/04; C08L 7/00; C08L 9/06; B60C 1/00
[52] U.S. Cl. ........................ 525/84; 525/78; 152/209 R
[58] Field of Search ............... 525/78, 80, 84; 152/209 R

[56] References Cited

U.S. PATENT DOCUMENTS

| | | |
|---|---|---|
| 3,622,652 | 11/1971 | Hamed et al. ............... 525/301 |
| 4,000,219 | 12/1976 | Smejkal ............... 525/84 |
| 4,341,695 | 7/1982 | Lee et al. ............... 825/80 |
| 4,652,612 | 3/1987 | Sattelmeyer et al. |
| 4,687,810 | 8/1987 | Coran ............... 525/78 |
| 4,898,223 | 2/1990 | Botzman et al. ............... 525/83 |

FOREIGN PATENT DOCUMENTS 1149773 4/1969 United Kingdom.
1533199 11/1978 United Kingdom.

OTHER PUBLICATIONS

Database Chemical Abstracts, vol. 89, No. 18, 1978, abstracts No. 147893q, Columbus, Ohio, US.
Database Chemical Abstracts, vol. 79, No. 4, 1973, abstract No. 20012q, Columbus, Ohio, US.
Database Chemical Abstracts, vol. 103, No. 16, 1985, abstract No. 124803d, Colubus, Ohio, US.

Primary Examiner—Carman J. Seccuro
Attorney, Agent, or Firm—Fay, Sharpe, Beall, Fagan, Minnich & McKee

[57] ABSTRACT

Pneumatic tires having an improved steering response have a tread portion which comprises a blend of a base elastomer and, as a steering response substance, a polymer of an unsaturated compound selected from methacrylic acid, acrylic acid and lower alkyl esters thereof. The steering response substance is preferably a graft copolymer of polyisoprene and methylmethacrylate. A preferred amount of the steering response substance is in the range from 5 to 60% by weight of the total of the base elastomer and the steering response substance.

14 Claims, No Drawings

PNEUMATIC TIRES

This invention relates to pneumatic tires having improved performance on the road: in particular it concerns means of improving steering response or frictional grip on wet road surfaces (referred to herein as "wet grip"). In a preferred form of the invention both steering response and wet grip are improved.

Steering response can be defined as the rate of deviation from the "straight ahead" vehicle position during driving by the application of a small steering input (about 15° of steering wheel revolution or about 0.5° slip angle). It is a very important factor in motor racing. Attempts made in the past to increase steering response (which is closely related to a tire's cornering stiffness) have been by increasing the stiffness of the tire compound in general and the tread in particular. However, in this past work it has been found that increasing the compound stiffness results in a corresponding reduction in the wet grip of the resulting tires for they then have a lower energy absorption potential (loss compliance).

It has now surprisingly been found that by inclusion of certain additives (referred to herein as "steering response substances") the steering response of tires can be increased substantially without any substantial detrimental affect on wet grip.

Accordingly, in a first aspect the present invention provides a pneumatic tire whose tread portion comprises a blend of a base elastomer and, as a steering response substance, a polymer of an unsaturated compound selected from methacrylic acid, acrylic acid and lower alkyl esters thereof.

The lower alkyl ester is conveniently one in which the lower alkyl group has 1 to 6 carbon atoms, for example it can be methyl, ethyl, propyl (n- or iso-) or butyl (n-, iso-, sec- or t-). Said ester is conveniently a lower alkyl ester of methacrylic acid, for example it can be methyl methacrylate, and it is with particular reference to the use of methyl methacrylate as the ester that the following description relates.

The steering response substance is conveniently a natural or synthetic rubber (referred to herein as an auxiliary rubber) modified with the lower alkyl ester of methacrylic acid or acrylic acid. For example, the modified rubber can be one obtained by graft or other polymerisation of the rubber with said ester. By way of example, where the auxiliary rubber is a natural rubber, the modified rubber can be a product obtained by graft copolymerisation of the natural rubber with said ester in monomeric form, the graft copolymerisation being effected, for instance, between an emulsion or dispersion of the auxiliary rubber and the ester, the content of the lower alkyl ester in the modified rubber being, for instance, in the range from 5% to 60% (for instance 15, 20, 30, 40, 45 or other proportion in the range 15 to 50%) by weight of the modified rubber.

In producing the tires of the present invention the steering response substance is used in any convenient proportion in the elastomer composition such that it will, on the one hand, provide a useful increase in steering response of pneumatic tires whose tread portion comprises the elastomer composition after vulcanisation and, on the other hand, is not sufficiently high as to derogate from the other desirable properties of the composition. Suitable amounts of the steering response substance depend, to some extent at least, on its content of the lower alkyl ester. However, in general, the steering response substance can be used in an amount in the range 5 to 100 parts by weight per hundred parts of rubber, that is of the total weight of the tire tread polymer (referred to below as the base elastomer) and the steering response substance.

Where the base elastomer is an SBR rubber the amount is preferably in the range from 10 to 50 parts, especially 15 to 30 parts per 100 parts of rubber; where the base elastomer is a natural rubber the amount of steering response substance is preferably in the range 10 to 80, especially 15 to 40, 50 or 60 parts per 100 parts of rubber. As can be seen from the Examples below good results have been obtained using 20 parts of the steering response substances referred to as MG30 and MG49 in an amount of 20 parts per 100 parts of rubber.

If desired, the amount of steering response substance can be assessed in terms of the amount of methyl methacrylate (or other lower alkyl ester) in the tire tread composition. Thus, where as in Example 2 below the steering response substance MG30 is used in an amount of 20 parts per 100 parts of rubber and contains 30% by weight of methyl methacrylate the content of methyl methacrylate in the tread composition is about 6%; the corresponding figure for the use in Example 3 of MG 49 at the rate of 20 parts per 100 rubber is about 9.8% methyl methacrylate content.

The steering response substance can be incorporated in the elastomer composition in any convenient way; however, in general it is incorporated in the composition concurrently with incorporation of the vulcanisation agents and in like manner.

Instead of, or as well as, the lower ester of methacrylic acid or acrylic acid there can be used in this invention methacrylic acid and/or acrylic acid. Thus, for example the steering response substance can be a graft or other copolymer of an auxiliary rubber and methacrylic acid and/or acrylic acid.

The invention is illustrated by the following Examples of which Examples 1 and 4 are control or comparative examples containing no added steering response substance and Examples 2, 3, 5 and 6 are examples of the invention containing a steering response substance.

The base elastomeric polymers used in Examples 1, 2 and 3 and 4, 5 and 6, respectively, were an emulsion SBR and a natural rubber; and the compounding ingredients where chosen so that the compositions of Examples 1-3 were suitable for the tread of motor car tires and the compositions of Examples 4-6 for truck tires. Examples 7-12 relate to vulcanised compositions obtained by vulcanising the compositions of Examples 1-6 respectively.

In the Examples all "parts" are by weight unless stated to the contrary and the abbreviations used have the following meanings:

MG 30 and MG 49 are each a graft copolymer obtained by graft polymerising methyl methacrylate in natural rubber latex and containing, respectively, nominal proportions of 30 and 49% by weight of poly(methyl methacrylate). They have been obtained from the Rubber Research Institute of Malaysia, PO Box 150, Kuala Lumpar, Malaysia.

SBR (23%S)—a styrene-butadiene copolymer having a styrene content of 23% by weight.

SMR 20—a natural rubber

N 375 black—a carbon black

Enerflex 94—an aromatic extending oil sold by British Petroleum Company

6PPD—an antidegradant

TMQ—an antidegradant

CBS—cyclohexylbenzthiazyl sulphenamide vulcanisation accelerator

The stearic acid referred to in the Examples was a blend of fatty acids sold for use in the rubber industry and containing fatty acids having nine to 21 carbon atoms in the hydrocarbon chain.

The rubber compositions of Examples 1 to 6 were obtained by blending together in an internal mixer the ingredients as shown in Table 1, and the resulting compositions were moulded into test pieces, the cure being under the conditions referred to below.

The rubber compositions of Examples 2 and 3 have the same constitution as that of the control Example 1 except that they contain 20 parts of MG30 and MG 49, respectively in place of 20 parts of the base polymer. Similarly, the rubber compositions of Examples 5 and 6 have the same constitution as that of Example 4 except that they contain 20 parts of MG 30 and MG 49, respectively in place of 20 parts of the base polymer.

TABLE 1

|  | Example No |  |  |  |  |  |
|---|---|---|---|---|---|---|
|  | 1 | 2 | 3 | 4 | 5 | 6 |
| SBR (235 S) | 100.00 | 80.00 | 80.00 | — | — | — |
| SMR20 (NR) | — | — | — | 100.00 | 80.00 | 80.00 |
| MG 30 | — | 20.00 | — | — | 20.00 | — |
| MG 49 | — | — | 20.00 | — | — | 20.00 |
| Zinc Oxide | 1.50 | | | 4.00 | | |
| Stearic Acid | 1.00 | | | 2.00 | | |
| N375 Black | 70.00 | | | 50.00 | | |
| Aromatic Oil | 37.50 | | | — | | |
| 6 PPD | 1.00 | | | 1.00 | | |
| TMQ | 0.50 | | | 0.50 | | |
| Paraffin Wax | 1.00 | | | 1.00 | | |
| Sulphur | 1.80 | | | 1.20 | | |
| CBS | 1.80 | | | 1.20 | | |
|  | 216.10 | | | 160.90 | | |

EXAMPLES 7 to 12

Part of each of the six rubber compositions of Examples 1 to 6 was moulded into test samples and subjected to vulcanisation conditions comprising 15 minutes while the temperature was raised to 165° C. followed by 20 minutes at that temperature. The resulting vulcanised test samples were tested using the dynamic response apparatus described in the paper by J.E. Smith and E.C. Sumner, published in "Proceedings of the International Rubber Conference 1972". The test conditions and the values obtained for complex modulus and loss factor are shown in Table 2 below.

A second part of each of the six rubber compositions of Table 1 was tested to assess its wet grip on a road surface. Each of those compositions was used as the tread compound of model tires of size 2.25-8 inches (57-203 mm). The tires were moulded under the following vulcanisation conditions: 60 minutes at 155° C. These model tires were subjected to two tests as follows:

Grip on a wet Delugrip road surface (Delugrip is a Registered Trade Mark) was measured using the internal drum machine described in a paper by R. J. Blythe published in "Proceedings of The International Rubber Conference", 1986, Gothenburg, Sweden. Measurements of the wet grip were made for peak and locked wheel sliding friction over a range of speeds from 8.9 to 22.4 m/sec. The test was repeated using a Bridport pebble surface instead of the Delugrip surface. The results obtained were normalised relative to the control. The results (together with mean normalised values for the two surfaces) are shown in Table 3.

TABLE 2

| Dynamic response | Example No. | | | | | |
|---|---|---|---|---|---|---|
| Apparatus (DRA) | 1 | 2 | 3 | 4 | 5 | 6 |
| 3% deflection and 15HZ Complex Modulus at 23° C. (MPa) | 11.0 | 12.4 | 13.9 | — | — | — |
| Loss Factor at 23° C. | 0.40 | 0.42 | 0.44 | — | — | — |
| Calculated steering response | 6.5 | 7.0 | 7.5 | — | — | — |
| Calculated "Wet cornering" (g) | 0.58 | 0.58 | 0.60 | — | — | — |
| Complex Modulus at 80° C. (MPa) | — | — | — | 6.6 | 8.4 | 9.6 |
| Loss Factor at 80° C. | — | — | — | 0.13 | 0.16 | 0.17 |

TABLE 3

| Wet grip | Example No. | | | | | |
|---|---|---|---|---|---|---|
| (Internal drum) | 7 | 8 | 9 | 10 | 11 | 12 |
| Bridport Pebble (Peak) | 100 | 102 | 104 | 100 | 105 | 108 |
| Bridport Pebble (Locked) | 100 | 104 | 100 | 100 | 110 | 107 |
| Delugrip (Peak) | 100 | 102 | 105 | 100 | 102 | 92 |
| Delugrip (Locked) | 100 | 100 | 103 | 100 | 103 | 105 |
| Mean Rating | 100 | 102 | 103 | 100 | 105 | 107* |

*excluding Delugrip Peak

From Tables 2 and 3 it will be seen that use of the MG30 and MG49 has resulted in an increase in stiffness and in wet grip, especially where the base polymer is natural rubber.

The rheometry of each of the rubber compositions of Examples 7 to 12 is shown in Table 4 below. The meanings and means of calculation of the parameter symbols shown in Table 4 are given in Table 5 below.

TABLE 4

| Parameter | Example No. | | | | | | |
|---|---|---|---|---|---|---|---|
| Symbol | 7 | 8 | 9 | 10 | 11 | 12 | Units |
| RHnum | 2 | 2 | 2 | 2 | 2 | 2 | |
| min | .96 | 1.14 | 1.13 | 2.48 | 2.67 | 2.82 | N · m |
| S | 6.42 | 6.67 | 7.08 | 4.43 | 4.48 | 4.30 | mins |
| T35 | 7.83 | 7.83 | 8.33 | 5.38 | 5.47 | 5.35 | mins |
| T90 | 13.08 | 12.25 | 12.58 | 7.75 | 8.00 | 7.92 | mins |
| CR | .67 | .85 | .89 | 1.75 | 1.73 | 1.74 | N · m/min |
| MAX-min | 5.49 | 5.77 | 5.94 | 6.96 | 7.25 | 7.50 | N · m |
| OT | 6.45 | 6.91 | 7.07 | 9.44 | 9.91 | 10.32 | N · m |
| MT | — | — | — | — | — | — | N · m |
| RR | 0.007 | — | — | — | — | — | N · m/min |
| RI (1) | — | — | — | — | — | — | |
| RI (16) | — | — | — | — | — | — | |
| T100 | 22.83 | 22.67 | 26.25 | 13.50 | 13.58 | 14.67 | mins |

TABLE 5

| | Parameter Descriptions | | |
|---|---|---|---|
| Parameter | Symbol | Calculation | Units |
| Plasticity | min | minimum torque | Nm |
| Scorch | S | time to min + 0.2265 Nm (+2.0 inch lbs) | minutes |

TABLE 5-continued

Parameter Descriptions

| Parameter | Symbol | Calculation | Units |
|---|---|---|---|
| Time to 35% - link density | T35 | time to 35% of max-min | minutes |
| Time to 90% - link density | T90 | time to 90% of max-min | minutes |
| Cure rate | CR | $\frac{0.9 \,(\text{max-min}) - 0.2265}{T90 - 5}$ | $\frac{Nm}{\text{minutes}}$ |
| X link density | Max-min | torque at Max - torque at min | Nm |
| Optimum torque | OT | maximum torque when reversion occurs | Nm |
| Maximum torque | MT | maximum torque when reversion does not occur | |
| NB | MT can be at 60, 90 or 120 minutes depending on the time chosen for the compound to be tested. | | |
| Reversion rate | RR | $\frac{OT - \text{torque } 10 \text{ mins beyond } OT}{10}$ | $\frac{Nm}{\text{minutes}}$ |
| Reversion index (1) | RI(1) | $\frac{100 \,(OT - \text{torque at } 60 \text{ mins})}{OT - \text{min}}$ | — |
| Reversion index (16) | RI(16) | $\frac{100 \,(OT \text{ torque at } 16 \text{ hours})}{OT - \text{min}}$ | — |
| Time to optimum torque | T100 | required for computing T100 - 10 for reversion rate calculation | mins |

We claim:

1. A pneumatic tire, with improved steering response, whose tread portion comprises a composition including a blend of a base elastomer of a styrene butadiene rubber or a natural rubber and, as a steering response substance a graft copolymer of polyisoprene and an unsaturated compound selected from methacrylic acid, acrylic acid and lower alkyl esters thereof, the graft copolymer being compatible with the base elastomer and said steering response substance being present in an amount in a range of 5 to 60 parts by weight per 100 parts of the total weight of the base elastomer and the steering response substance, whereby frictional grip on wet road surfaces is not reduced as a result of improved steering response.

2. A pneumatic tire according to claim 1, in which said copolymer has been obtained by a process of subjecting a natural rubber latex to graft polymerisation with said unsaturated compound.

3. A pneumatic tire according to claim 1, in which said unsaturated compound is methyl methacrylate.

4. A pneumatic tire according to claim 1 in which the steering response substance is present in the blend in an amount from 5 to 60 parts by weight per 100 parts of the total weight of the base elastomer and a steering response substance.

5. A pneumatic tire according to claim 1, in which said steering response substance is present in the blend in an amount from 15 to 50 parts by weight per 100 parts of the total weight of the base elastomer and the steering response substance.

6. A pneumatic tire according to claim 1, in which said blend comprises: (a) an SBR elastomer or a cis-1,4-polyisoprene as the base polymer, and (b) a graft copolymer of polyisoprene and methyl methacrylate as the steering response substance, said graft copolymer constituting from 10 to 40 parts by weight per 100 parts of the total weight of the base elastomer and the steering response substance.

7. A pneumatic tire according to claim 1 wherein the graft copolymer and the base elastomer are blended together and vulcanized using a single set of vulcanization conditions.

8. A pneumatic tire according to claim 1, in which the base elastomer is the styrene butadiene rubber and said amount of steering response substance is in the range from 10 to 50 parts by weight per 100 parts of the total weight of the base elastomer and the steering response substance.

9. A pneumatic tire according to claim 8, in which said amount of steering response substance is in the range from 15 to 30 parts by weight per 100 parts of the total weight of the base elastomer and the steering response substance.

10. A pneumatic tire according to claim 1, in which the base elastomer is the natural rubber.

11. A pneumatic tire according to claim 10, in which said amount of steering response substance is in the range from 15 to 40 parts by weight per 100 parts of the total weight of the base elastomer and the steering response substance.

12. A pneumatic tire according to claim 1, in which the polyisoprene is a natural rubber latex.

13. A pneumatic tire according to claim 1, in which an amount of said unsaturated compound in the graft copolymer is in a range from 5 to 60 parts by weight per 100 parts of the total weight of the graft copolymer.

14. A pneumatic tire according to claim 8, in which said amount of steering response substance is in the range from 15 to 50 parts by weight per 100 parts of the total weight of the base elastomer and the steering response substance.

* * * * *